INVENTOR
M. R. SCHROEDER
BY C. E. Hirsch
ATTORNEY

United States Patent Office 3,424,269

Patented Jan. 28, 1969

3,424,269

MULTIPATH FOCUSING SIGNAL PROCESSOR

Manfred R. Schroeder, Gillette, N.J., assignor to Bell Telephone Laboratories, Incorporated, Murray Hill, N.J., a corporation of New York Filed Sept. 30, 1966, Ser. No. 583,162

U.S. Cl. 181—.5 15 Claims

Int. Cl. G10k 11/00

ABSTRACT OF THE DISCLOSURE

The location of a signal source in a multipath transmission medium may be detected by processing received signals with an array of selected inverse filters and identifying the filter patterns that produce a maximum signal. Conversely, maximum power can be transmitted to a selected point within a multipath transmission medium by preprocessing the transmitted signals in an array of selected inverse filters.

This invention relates to signal processing and in particular to the processing of acoustic signals transmitted over multiple transmission paths from a source to a receiver in a reverberant medium. While this invention will be described in terms of acoustic mediums, the principles of this invention apply equally well to electromagnetic mediums and to combined acoustic-electromagnetic mediums.

In an unbounded medium, such as the air above an open field, an acoustic signal transmitted from a source to a receiver usually travels over a single direct transmission path to the receiver. Thus, an acoustic receiver, such as, for example, an array of two or more receiving elements, can usually be oriented so as to detect not only the receipt of the transmitted signal but also the direction from which it came.

Likewise, maximum acoustic energy can usually be transmitted in a selected direction in an unbounded medium by using a directional transmitter, such as, for example, a sound source combined with a megaphone.

On the other hand, in a reverberant medium bounded in one or more dimensions, such as a room, sound stage, or auditorium, a signal often travels from a source to a receiving element over multiple transmission paths rather than over a single transmission path. Unfortunately, the signal transmitted to the receiving element over the shortest path is often partially, if not wholly, masked, either by other versions of the same signal arriving at the same receiving element over other less direct paths, or by background noise. Under these conditions, to detect the receipt of a transmitted signal is difficult; to determine the direction from which it comes is sometimes impossible.

Accordingly, an object of this invention is to increase the probability of detecting a signal transmitted through a reverberant medium from a source to a receiver.

Another object is to locate the source of such a signal.

Conversely, the transmission of a selected signal to a particular region in a reverberant medium is likewise difficult because of the multiple transmission paths sustained by the medium between the transmitter and the region. Thus, a listener in the region is often unable to detect the receipt of the transmitted signal either because of background noise or because of the incoherent receipt of several different versions of the transmitted signal.

Accordingly, another object of this invention is to increase the probability of detecting a signal transmitted through a reverberant medium to a selected region in the medium.

These and other related objects are achieved in this invention by use of a technique called "volume focusing." Just as maximum signal power can be received from or transmitted in a selected direction in an unbounded medium, it has been discovered that maximum signal power can be received from, or transmitted to, the region in a reverberant medium surrounding a selected point—the so-called "focal volume." This is accomplished by carefully processing the transmitted signal to compensate for the distortion introduced by the multiple transmission paths sustained by the medium between the receiver and the source, or between the transmitter and the focal volume. This processing is carried out by the use of so-called matched filters; that is, filters with frequency characteristics which are the complex conjugates of the frequency characteristics of the multipath transmission channels between the source and the receiver. Thus, each matched filter has amplitude characteristics proportional to the amplitude characteristics of a corresponding multipath transmission channel and phase characteristics inverse to the phase characteristics of this channel.

It has further been discovered that the probability of detecting a signal transmitted from a point source in a reverberant medium is enhanced by using an array of receiving elements positioned in the medium in combination with a set of matched filters, rather than by using just a single receiving element. Likewise, in the converse situation, it has been discovered that the probability of a listener in a reverberant medium detecting a transmitted signal is similarly enhanced by using an array of transmitting elements in combination with a set of matched filters, rather than by using just a single transmitting element.

Thus, in one embodiment of this invention, a set of matched filters possessing frequency characteristics the complex conjugates of those of the transmission channels between a selected source and an array of receiving elements, is connected on a one-to-one basis to the receiving elements in the array. The signal detected by each receiving element is passed through the corresponding matched filter and combined with other similarly filtered signals to produce an output signal. This output signal reaches a clearly defined maximum with the receipt of a signal from the selected source. The occurrence of this maximum is detected by passing this output signal through a comparator circuit.

In another embodiment of this invention, a set of matched filters is connected on a one-to-one basis to an array of transmitting elements, such as loudspeakers or ultrasonic sound generators. Each filter is matched to the phase and amplitude characteristics of the transmission channel between its corresponding transmitting element and a selected focal volume in the bounded reverberant medium. The pretransmission filtering of the signal issued from each transmitting element ensures that maximum signal power is concentrated in the selected focal volume, thereby enhancing the probability of detecting the transmitted signal in this focal volume.

The principles of this invention can, in addition, be used to detect the existence of an active signal source in a reverberant medium. The frequency characteristics of the transmission channels from each point in the medium to an array of receiving elements positioned in the medium are usually unique. Sets of matched filters are synthesized, with the filters in each set compensating for the frequency characteristics of the transmission channel between a corresponding calibration point in the medium and the array of receiving elements. Signals generated by the receiving elements in response to acoustic signals are then passed through the sets of matched filters. Those sets which yield output signals with power levels above a selected threshold level correspond to calibration points near which are located active signal sources of potential interest.

Of course, the fact that a particular set of matched filters yields an output signal of large power is not a guarantee that that this signal comes from a source of interest. Usually a replica of the signal actually transmitted by the source is necessary to determine the nature of the source. While matched filters will, under certain conditions, yield an approximate replica of a transmitted signal, this is not always so. An exact replica of the transmitted signal, suitable for further analysis, can usually be obtained by use of apparatus described in the copending application by J. L. Flanagan entitled "Signal Processor," Serial No. 583,185, filed September 30, 1966, and assigned to Bell Telephone Laboratories, the assignee of this application.

This invention may be more fully understood from the following detailed description taken together with the drawings in which.

*Receiving apparatus*

Figures 1, 2:
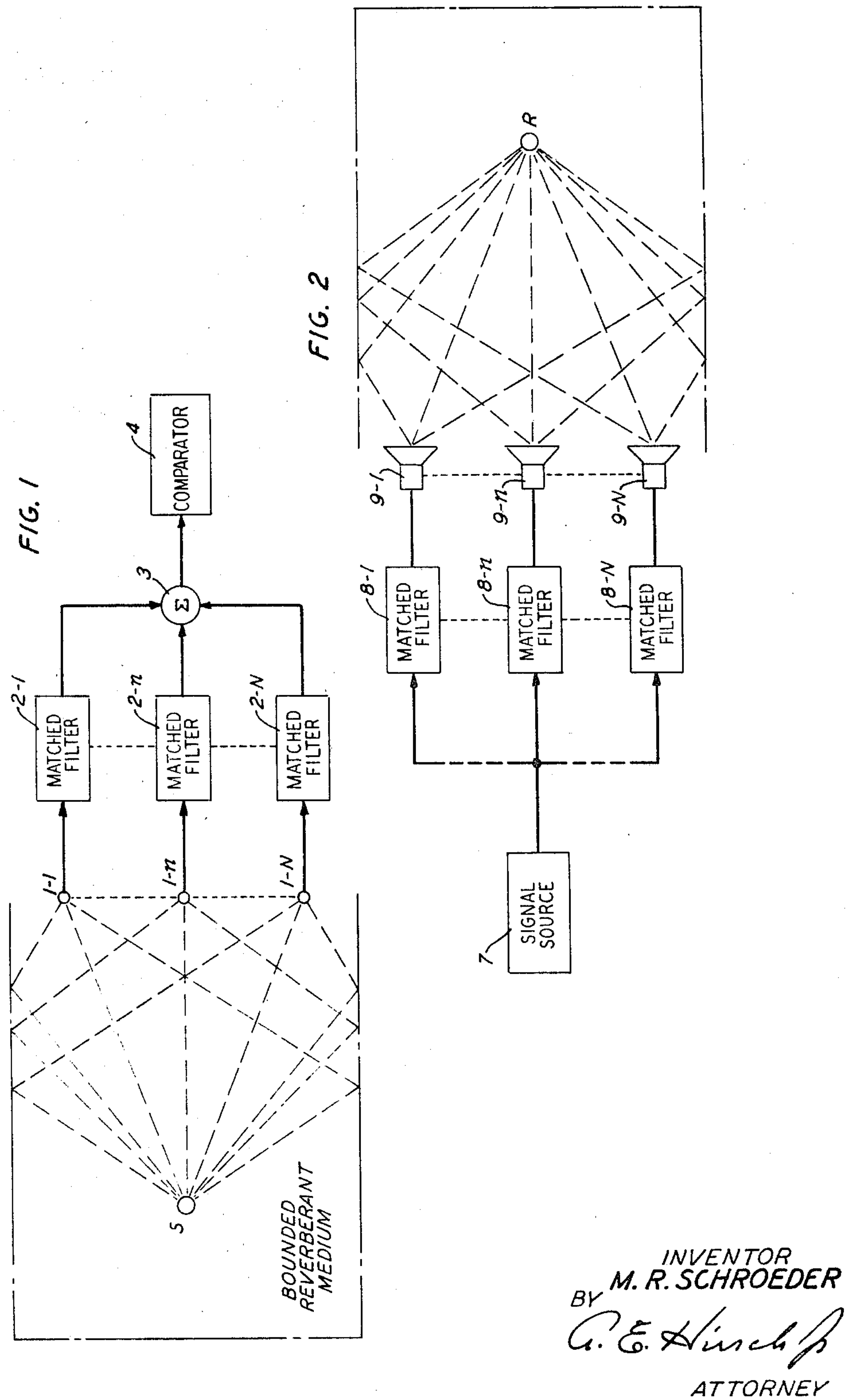
FIG. 1 is a schematic block diagram of receiving apparatus constructed according to the principles of this invention.
FIG. 2 is a schematic block diagram of transmitting apparatus constructed according to the principles of this invention.

FIG. 1 shows receiving apparatus positioned, for example, in a bounded reverberant medium. Energy from source S located in the reverberant medium is transmitted over multiple transmission paths, as shown, to each receiving element 1–$n$ in the array of receiving elements 1–1 through 1–N, where N and $n$ are positive integers and $n$ has a value given by $1 \leq n \leq N$.

Each receiving element can comprise, for example, a high quality microphone or similar transducer capable of operating over the frequency range occupied by the transmitted signals. Such transducers are well known in the art and thus will not be described in detail.

The signal detected by each receiving element 1–$n$ is passed through a corresponding matched filter 2–$n$. The signals from matched filters 2–1 through 2–N are added in summing network 3. Comparator 4 then processes the signal from network 3 and, when this signal exceeds a threshold value, indicates the receipt of a signal from source S.

The signal detected by each receiving element 1–$n$ in general consists of several unequally attenuated and unequally delayed versions of the transmitted signal. Thus, when the transmitted signal is an impulse, each receiving element detects several unsynchronized impulses of different amplitudes. Accordingly, the frequency characteristics of the $n^{th}$ transmission channel (that is, the channel from source S to element 1–$n$) can be represented by an equation of the form $$H_n(\omega) = \sum_{k=1}^{K} a_{nk} e^{-j\omega\tau_{nk}} \quad (1)$$

where $a_{nk}$ is the amplitude of the $k^{th}$ pulse detected by the $n^{th}$ receiving element, $j=\sqrt{-1}$, $\omega$ is frequency, $\tau_{nk}$ is the time of arrival of the $k^{th}$ impulse at the $n^{th}$ receiving element relative to the time of transmission, and K is the number of paths comprising the $n^{th}$ transmission channel.

It is well known that the energy detected by a receiver is maximized if the received signal is passed through a so-called matched filter; that is, a filter with amplitude characteristics equal to the amplitude characteristics of the transmission channel and with phase characteristics inverse to the phase characteristics of the transmission channel. As shown in the article by G. L. Turin entitled "An Introduction to Matched Filters," published in the June 1960 IRE Transactions on Information Theory, pages 311 to 329, the frequency characteristics of such a filter are just the complex conjugate of the frequency characteristics of the transmission channel.

Thus, the frequency characteristics of a filter matched to the transmission characteristics of the $n^{th}$ multipath transmission channel are given by $$H_n^*(\omega) = \sum_{k=1}^{K} a_{nk} e^{-j\omega(T-\tau_{nk})} \quad (2)$$

where $()^*$ represents the complex conjugate function, and T is a finite delay greater than the duration of the longest impulse response associated with a receiving element 1.

Based on Equation 2, a filter matched to the $n^{th}$ multipath transmission channel is obtained by placing K output taps on a delay line at positions corresponding to T minus the delays $\tau_{nk}$ associated with the multiple transmission paths in the transmission channel between the source S and the $n^{th}$ receiving element 1–$n$. Such a filter is shown in FIG. 3.

Figure 3:
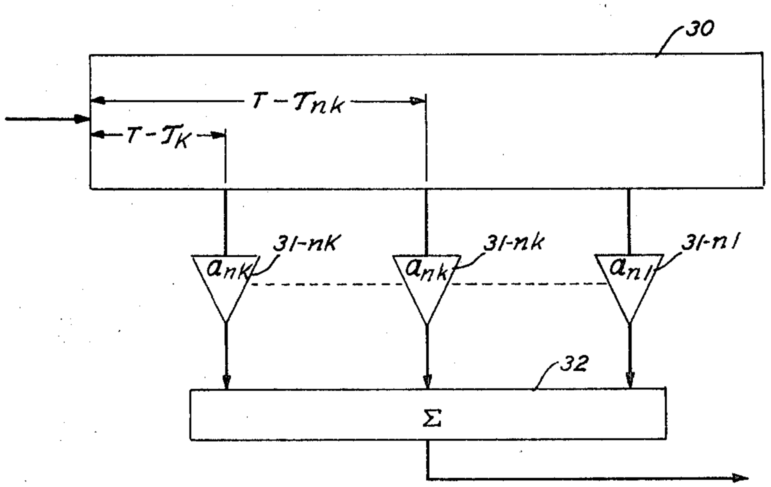
FIGS. 3 and 4 are block diagrams of matched filters suitable for use in this invention.

In FIG. 3, delay line 30 (similar, for example, to the delay line shown on page 291 of "Pulse and Digital Circuits" by Millman and Taub, published by McGraw-Hill, Inc., 1956) has attached to it K output taps corresponding on a one-to-one basis to the K transmission paths in the transmission channel from the source S to the selected receiving element 1–$n$ (FIG. 1). The $k^{th}$ tap has associated with it a delay $T-\tau_{nk}$. The output signal from the $k^{th}$ tap is amplified or attenuated, as necessary, in network 31–$nk$ by an amount $a_{nk}$ equal to the amplification or attenuation of the impulse transmitted on the $k^{th}$ path.

The signals from each of the networks 31 are summed in summing network 32. When the signal received at the $n^{th}$ receiving element is from source S, the output signal from network 32 is most probably of maximum energy compared to the signal from any other source.

The delay time T is a function of the receiving element 1–$n$ (FIG. 1) to which the matched filter 2–$n$ is attached. Thus, T varies from filter to filter and is selected at each filter to ensure that the signals from the matched filters 2–1 through 2–N are synchronized in time when they enter summing network 3. When the signal transmitted from source S is received at all the receiving elements 1, the filtered signals entering summing network 3 reinforce each other. Consequently, the signal energy from network 3 reaches a clear maximum when the receiving elements have received the signal transmitted from source S. On the other hand, signals transmitted from any other sources in the bounded reverberant medium arrive unsynchronized at summing network 3, with the result that they are, in general, indistinguishable from ordinary background noise.

The matched filter shown in FIG. 3 is suitable for use in a nondispersive multipath transmission medium; that is, in a medium in which the propagation velocity is not a function of frequency. In such a medium, an impulse generated by a source travels to a receiving element over a number of different paths and thus, in general, appears at the receiving element as a number of unsynchronized and unequally attenuated impulses, as described above.

On the other hand, in a dispersive transmission medium, propagation velocity is a function of frequency. Thus, an impulse generated at a source, such as source S in FIG. 1, is spread out in time and distorted by each path in the multipath transmission channel between the source and a receiving element. Consequently, the impulse response of a transmission channel is, in general, a function of unspecified shape, rather than a series of unequally delayed and unequally attenuated impulses. The transfer function for a dispersive transmission channel can be approximated by the frequency transform of a series of impulses or "samples" spaced apart in time by the Nyquist sampling interval. Each sample has an amplitude proportional to the amplitude of the impulse response of the channel at a corresponding time.

Thus, the transfer function for a dispersive multipath channel between source S and receiving element 1–$n$ in FIG. 1 can be derived by considering the number of separate transmission paths K constituting this channel to be equal to the number of samples M necessary to represent the function generated at this receiving element by an impulse at source S. Therefore $$H_n(\omega)=\sum_{m=1}^{M} a_{nm}e^{-j\omega(mT_n)} \quad (3)$$

where M is the total number of samples necessary to represent the function generated at the $n^{th}$ receiving element by an impulse at source S. $T_n$ is the Nyquist sampling interval determined by the highest significant frequency component in the impulse response of the dispersive transmission channel at the $n^{th}$ receiving element, $a_{nm}$ is the amplitude of the $m^{th}$ pulse, and $m$ is a positive integer given by $1 \leq m \leq M$. In general M is a function of the duration of the impulse response of the dispersive transmission channel.

A matched filter is synthesized by taking the complex conjugate of the frequency characteristics $H_n(\omega)$ of the transmission channel:

$$H_n^*(\omega)=\sum_{m=1}^{M} a_{nm}e^{-j\omega(T-mT_n)} \quad (4)$$

The term T in Equation 4 is, as in Equation 2, merely a delay factor introduced to make the matched filter realizable and to synchronize the signals passed through the $n^{th}$ matched filter with the signals passed through the other matched filters.

Figure 4:
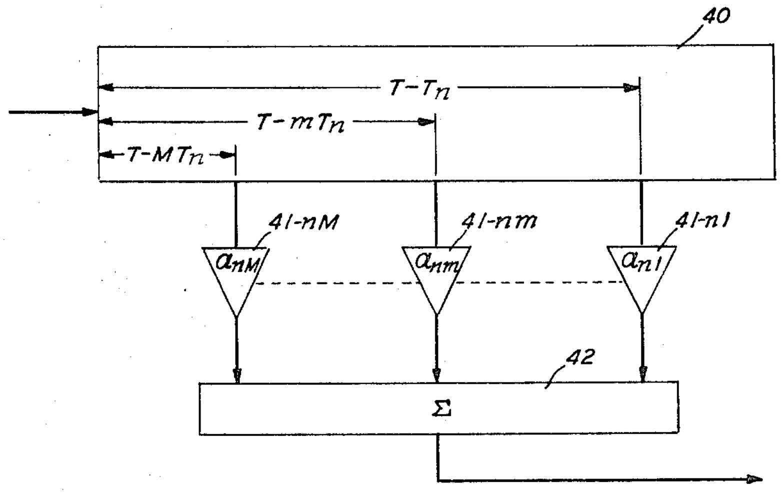

Thus, as shown in FIG. 4, the matched filter for a dispersive transmission medium contains a delay line 40 to which are attached M output taps. The first tap is placed on the delay line at a position corresponding to a time delay $T-T_n$. Thus, this tap is placed farthest from the input to the delay line. This output tap is connected to amplifying or weighting network 41–$n$1, the gain of which is proportional to the amplitude of the first sample of the impulse response at the $n^{th}$ receiving element.

The $m^{th}$ tap is placed on the delay line at a position corresponding to a delay of $T-mT_n$. Amplifying or attenuating network 41–$nm$, connected to this output tap, has a gain proportional to the amplitude of the $m^{th}$ sample of the impulse response at the $n^{th}$ receiving element.

The $M^{th}$ output tap of the delay line is positioned $T-MT_n$ seconds from the input to the delay line. The gain $a_{nM}$ of network 41–$n$M, connected to this tap, is proportional to the amplitude of the $M^{th}$ or last sample of the impulse response at the $n^{th}$ receiving element.

Output signals from all the amplifiers or attenuators 41 are summed in summing network 42. The signal from network 42 reaches a maximum $T-T_n$ seconds after the impulse response of the transmission channel from source S (FIG. 1) to receiving element 1–$n$ is first detected at element 1–$n$. This is precisely the time when all the "samples" of the impulse response are located in the delay line adjacent their corresponding output taps. When matched filters similar to the one shown in FIG. 4 are used in the receiving apparatus of FIG. 1, the signals from each of the filters are summed in network 3 and processed in comparator 4, as before, to detect the receipt of a signal above a selected threshold level.

*Transmision system*

FIG. 2 shows a transmitting system designed to transmit maximum energy to a selected region or focal volume in a reverberant medium. A signal, generated by source 7, is sent simultaneously through filters 8–1 through 8–N to acoustic transmitters 9–1 through 9–N. In the usual case these transmitters are loudspeakers, although they can also be ultrasonic sound generators or other sound generating devices.

Each filter 8–$n$ is matched to the multipath transmission channel between its corresponding transmitting element 9–$n$ and the focal volume R at which it is desired to produce maximum energy, for example, in a bounded reverberant medium. Eash filter 8–$n$ could, for example, be similar in structure to the filters shown in either FIG. 3 or FIG. 4. Thus, the delay time T associated with each filter is selected to ensure that the signal transmitted from each transmitting element 9–$n$ arrives at region R in syncrony with the signals from the other transmitting elements. This is necessary because in general each transmitting element 9–$n$ is a different distance from region R relative to the other transmitters.

*Search apparatus*

Each point $p$ in a reverberant medium has, in general, a unique set of transfer functions, $H_{1,p}(\omega)$ through $H_{N,p}(\omega)$, describing the N transmissino channels between that point and the receiving elements in an array of N such elements. Thus, systems capable of determining the locations of active sound sources are possible using the principles of this invention. Two such systems are shown in FIGS. 5 and 6.

Figure 5:
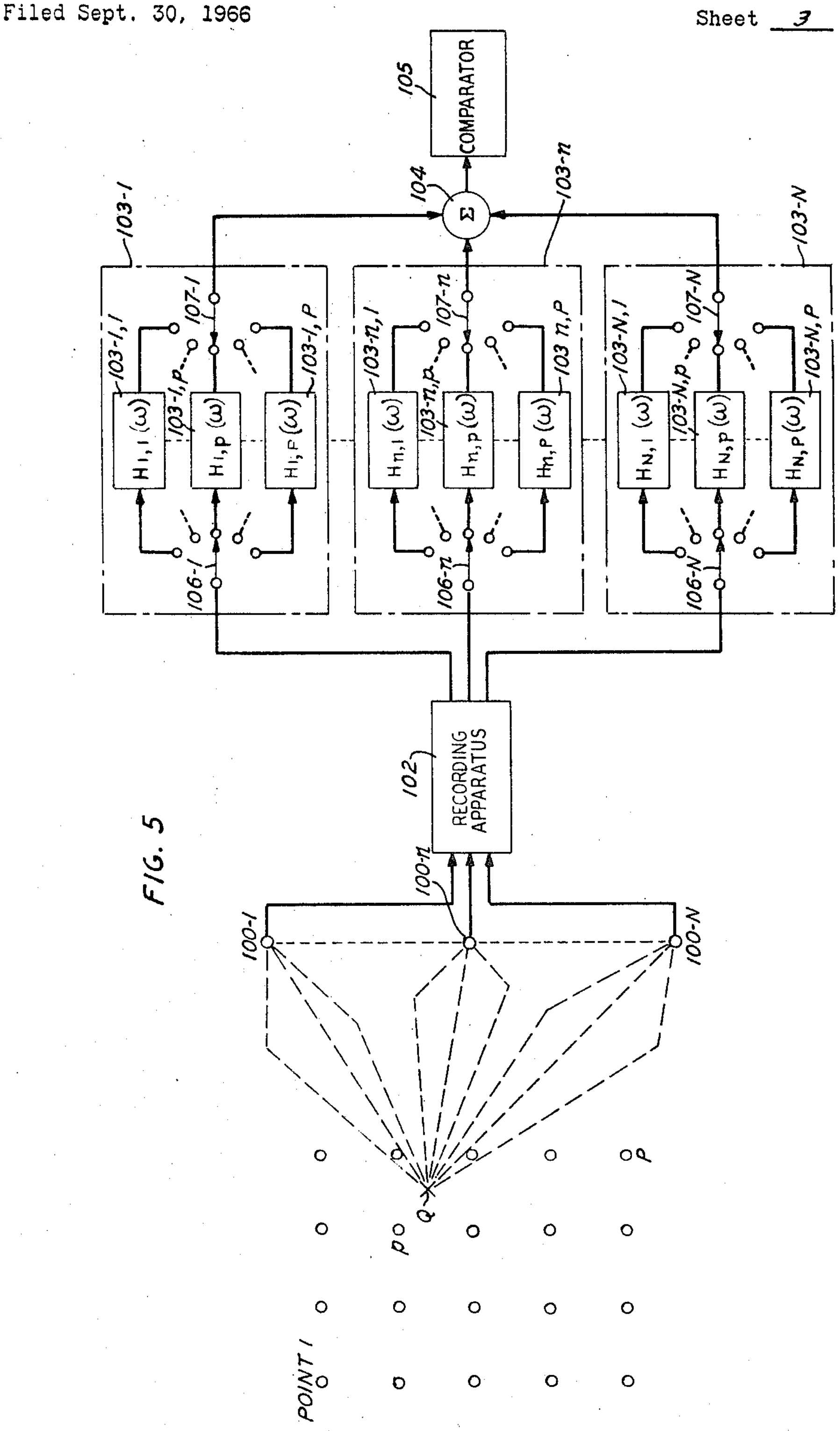
FIGS. 5 and 6 are block diagrams of search apparatus constructed according to the principles of this invention.
Figure 6:
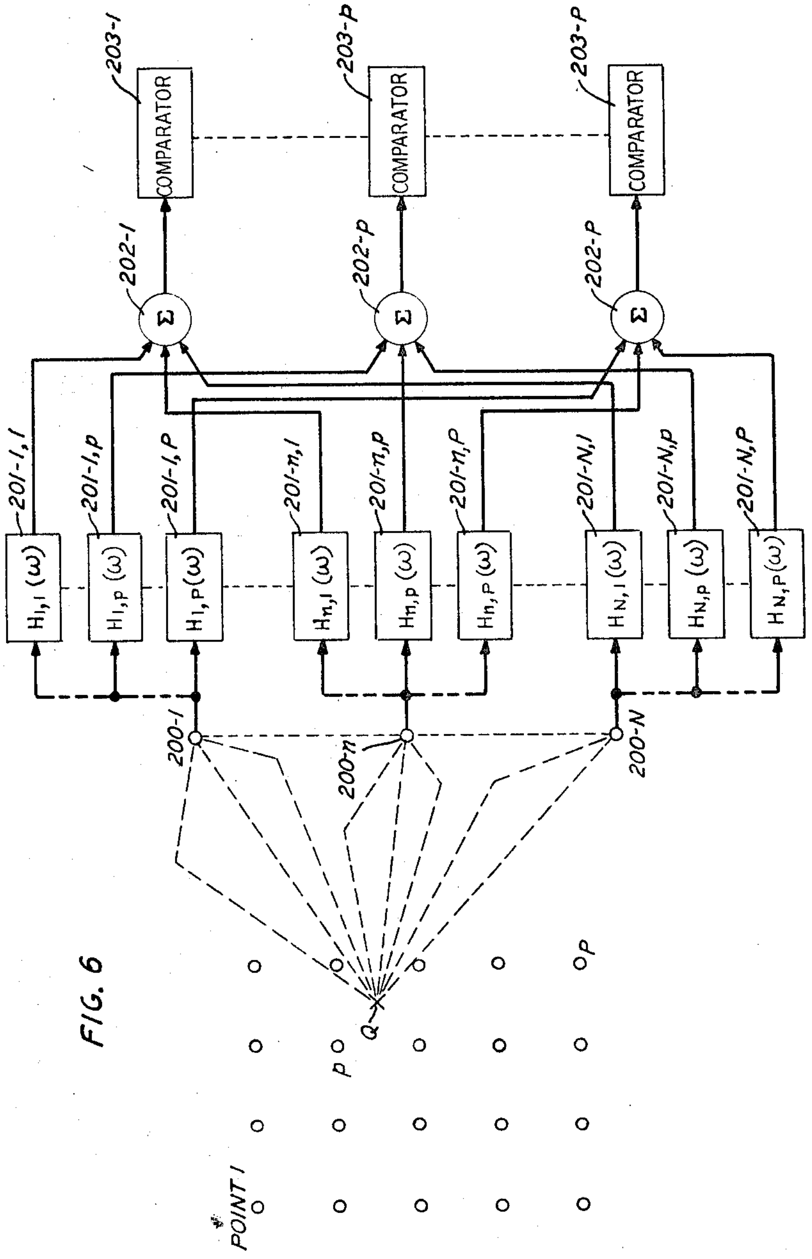

In FIGS. 5 and 6 an array of N fixed receiving elements is calibrated by well known techniques so that the frequency characteristics of the transmission channels between a large number, P, of known points in the medium, and each receiving element in the array are known. By passing the signals detected at each receiving element in the array through P sets of matched filters corresponding to the P known locations in the medium, the set of filters which yields maximum signal power is determined. Since this set of filters corresponds to a known point $p$ in the reverberant medium, the most probable location of the active source is in the vicinity of this point.

In FIG. 5 the signal received by each receiving element is recorded on a multichannel tape in recording apparatus 102. Each channel of the tape corresponds to one of the receiving elements. Thus, recording apparatus 102 provides, for later analysis, a permanent record of the signals received by the N receiving elements 100. The recording apparatus can, if desired, simultaneously record and re-record the signals received by the receiving elements 100. The re-recording makes possible the analysis of the recorded information during the recording process. Recording apparatus which operates in the above described manner is well known in the signal processing arts and thus will not be described in detail.

The recorded signals are passed simultaneously through a set of N matched filters 103–1,$p$ through 103–N,$p$, each with amplitude characteristics proportional to those of the transmission channel between the point $p$ and a corresponding one of the N receiving elements 100, and with phase characteristics inverse to those of this transmission channel. Switches 106–1 through 106–N and 107–1 through 107–N allow the received signals to be passed through the set of matched filters corresponding to any calibration point $p$ in the medium.

The signals passed through a particular set of filters are transmitted to summing network 104. When the set of matched filters through which the received signal is passed corresponds to the calibration point $p$ nearest the unknown location of the active source Q, the network 104 produces a signal of maximum power. Thus, the location of this source is most probably at or near the point $p$ for which these filters were calibrated.

The output signal from network 104 is sent to comparator 105. Comparator 105 compares the amplitude level of this output signal to a reference level. Thus, when the signal from the active source is received and the correct set of matched filters is used to process this signal, comparator 105 generates an indication of the receipt of this signal. The set of filters 103 used to generate this indication gives the most probable location of the active source.

In FIG. 6 the signals received at the receiving elements 200 are passed simultaneously through the P sets of N matched filters, 201–1,1 through 201–N,1 to 201–1,P through 201–N,P, corresponding on a one-to-one basis to the P calibration points throughout the reverberant medium. The signals passed through the filters 201–1,*p* through 201–N,*p*, corresponding to the $p^{th}$ calibration point in the medium, are combined in summing network 202–*p* and sent to comparator 203–*p*. As explained above, each comparator 203 produces an output signal which indicates when an active source Q is located in the vicinity of the calibration point *p* corresponding to the comparator.

Other embodiments of this invention will be obvious in light of this disclosure to those skilled in the signal processing arts. In particular, while the embodiments of this invention have been described for acoustic signals, other embodiments capable of operating with electromagnetic signals will be apparent from the above disclosure. Further, in some situations, obvious to those skilled in the art, a single receiving or transmitting element, used in conjunction with a matched filter of the type described above will yield satisfactory results.

What is claimed is:

1. Apparatus which comprises
- an array of receiving elements, each of said receiving elements being linked by a separate multipath transmission channel to a source of a signal,
- a plurality of matched filters connected on a one-to-one basis to said receiving elements,
- a summing network connected to each of said plurality of filters, and
- a comparator connected to said summing network for producing an indication of the receipt of a high amplitude replica of said signal.

2. Apparatus as in claim 1 in which each of said matched filters comprises
- a delay line possessing a plurality of output taps placed at predetermined locations on said delay line,
- a plurality of amplifiers connected on a one-to-one basis to said plurality of output taps, and
- a summing network possessing a plurality of input terminals connected on a one-to-one basis to said amplifiers.

3. Apparatus as in claim 2 in which said delay line possesses a plurality of K output taps connected to said delay line at positions corresponding to the delays associated with the multiple transmission paths in the multipath transmission channel linking the receiving element connected to said filter to said source, where K is equal to the total number of transmission paths in said channel.

4. Apparatus as in claim 2 in which said delay line possesses
- a plurality of M output taps connected to said delay line, the $m^{th}$ tap being connected to said delay line at a position corresponding to a delay of $T-mT_n$, where M is a positive integer equal to the number of samples necessary to represent the impulse response of the multipath transmission channel linking the receiving element connected to said filter to said source, T is a selected delay, $T_n$ is a selected Nyquist sampling interval, and *m* is a positive integer given by $1 \leq m \leq M$.

5. Apparatus which comprises
- an array of receiving elements, each of said receiving elements being linked by a separate multipath transmission channel to a source of an acoustic signal,
- a plurality of filters connected on a one-to-one basis to said receiving elements, each of said filters possessing amplitude characteristics proportional to the amplitude characteristics of the multipath transmission channel linking the receiving element connected to said filter to said source, and phase characteristics inverse to the phase characteristics of said channel,
- a summing network connected to each of said plurality of filters, and
- a comparator connected to said summing network for detecting the receipt of said acoustic signal.

6. Apparatus which comprises
- a source of a signal,
- an array of acoustic transmitting elements positioned in a reverberant medium, a separate multipath transmission channel linking each of said transmitting elements to a focal volume surrounding a focal point in said medium to which it is desired to transmit maximum signal energy, and
- a plurality of filters connected to said source, and, on a one-to-one basis, to said transmitting elements, each of said filters possessing amplitude characteristics proportional to those of the multipath transmission channel linking its corresponding transmitting element to said focal volume, and phase characteristics inverse to those of said channel.

7. Apparatus which comprises
- a source of a signal,
- an array of transmitting elements positioned in a reverberant medium, with a separate multipath transmission channel linking each of said transmitting elements to a focal volume surrounding a focal point in said medium, and
- a plurality of matched filters, each connecting said source to a corresponding one of said transmitting elements.

8. Apparatus as in claim 7 in which each of said plurality of matched filters comprises
- a delay line with a plurality of output taps placed at predetermined locations on said delay line,
- a plurality of amplifiers connected on a one-to-one basis to said plurality of output taps, and
- a summing network possessing a plurality of input terminals connected on a one-to-one basis to said amplifiers.

9. Apparatus as in claim 8 in which said delay line possesses
- a plurality of K output taps, each tap connected to said delay line at a position corresponding to the delay associated with a corresponding one of the multiple transmission paths in the multipath transmission channel linking the transmitting element connected to said matched filter to said focal volume, where K is equal to the total number of transmission paths in said channel.

10. Apparatus as in claim 8 in which said delay line possesses
- a plurality of M output taps connected to said delay line, the $m^{th}$ tap being connected to said delay line at a position corresponding to a delay of $T-mT_n$, where M is a positive integer equal to the number of samples necessary to represent the impulse response of the multipath transmission channel linking the transmitting element connected to said matched filter to said focal volume, T is a selected delay, $T_n$ is a selected Nyquist sampling interval, and *m* is a positive integer given by $1 \leq m \leq M$.

11. Apparatus which comprises
- a plurality of means, positioned in a reverberant medium, for converting acoustic signals into electrical signals,
- matched filter means for processing said electrical signals to produce an intermediate signal of maximum power during the time any sound source located within a selected focal volume in said medium generates an acoustic signal, and
- means responsive to said intermediate signal for indicating the receipt of the acoustic signal from, and the location of, said sound source.

12. Apparatus for determining the location of active sound sources in a bounded reverberant medium which comprises
- a plurality of N acoustic receiving elements, where N is a positive integer;

means for processing the signals received by each of said N receiving elements to produce a plurality of intermediate signals, said processing means comprising, an N channel recorder for recording on a separate channel the signals received by each of said N receiving elements, a second N channel recorder for re-recording said received signals, N sets of P matched filters, each set corresponding uniquely to a selected channel of said second recorder, and each filter in each set corresponding to a selected one of said P calibration points, a first set of N switches for simultaneously connecting each of said N channels of said second recorder to the *p*th matched filter in each set of P matched filters, where *p* is a positive integer given by $1 \leq p \leq P$, a summing network, and a second set of N switches operating in conjunction with said first set for simultaneously connecting the *p*th matched filter in each of said N set to said summing network, and means responsive to said plurality of intermediate signals for indicating the existence of an active sound source in the vicinity of any one of P calibration points throughout said bounded reverberant medium.

13. Apparatus for determining the location of active sound sources in a bounded reverberant medium which comprises, a plurality of N acoustic receiving elements, where N is a positive integer, means for processing the signals received by each of said N receiving elements to produce a plurality of intermediate signals, said processing means comprising, N sets of P matched filters, the filters in the *n*th set being connected to the *n*th receiving element, where *n* is a positive integer given by $1 \leq n \leq N$, and P summing networks, the *p*th summing network being connected to the *p*th filter in each of said N sets, where *p* is a positive integer given by $1 \leq p \leq P$, and means responsive to said plurality of intermediate signals for indicating the existence of an active sound source in the vicinity of any one of P calibration points throughout said bounded reverberant medium.

14. Apparatus as in claim 13 in which said indicating means comprises

P comparators connected to said P summing networks.

15. Apparatus which comprises an array of N acoustic receiving elements located in a bounded reverberant medium, where N is a positive integer, means for storing the N acoustic signals received by said N receiving elements, P sets of N matched filters each, said P sets corresponding on a one-to-one basis to P calibration points 1 . . . *p* . . . P at known locations throughout said medium, wherein the *n*th filter in the *p*th set possesses ampiltude characteristics proportional to those of the transmission channel linking the *p*th calibration point to the *n*th receiving element and phase characteristics inverse to those of said transmission channel, where *p* and P are positive integers with *p* given by $1 \leq p \leq P$, and where *n* is an integer given by $1 \leq n \leq N$, a first set of switches for connecting said storing means to the N matched filters in said *p*th set, a summing network, a second set of switches operated in conjunction with said first set of switches, for connecting said N filters in said *p*th set to said summing network, and comparator means connected to said summing network for producing an indication of the receipt of a transmitted signal.

References Cited

UNITED STATES PATENTS

| | | | |
|---|---|---|---|
| 2,101,408 | 12/1937 | Muzzey | 181—0.5 |
| 2,745,507 | 5/1956 | Bodine | 181—0.5 |
| 2,982,852 | 5/1961 | Fano | 340—15.5 |
| 3,172,077 | 3/1965 | Hawkins. | |
| 3,217,828 | 11/1965 | Mendenhall et al. | |
| 3,252,130 | 5/1966 | Griffith. | |
| 3,286,782 | 11/1966 | Batteau | 181—0.5 |
| 3,303,335 | 2/1967 | Pryor | 340—15.5 |
| 3,307,190 | 2/1967 | Clay et al. | 340—15.5 |
| 3,341,810 | 9/1967 | Wallen | 181—0.5 |

BENJAMIN A. BORCHELT, *Primary Examiner.*

JAMES FOX, *Assistant Examiner.*

U.S. Cl. X.R.

340—3, 15.5